United States Patent
Wada et al.

(10) Patent No.: US 11,247,929 B2
(45) Date of Patent: Feb. 15, 2022

(54) SLEEVE FOR GLASS TUBE MOLDING

(71) Applicant: NIPPON ELECTRIC GLASS CO., LTD., Otsu (JP)

(72) Inventors: Masanori Wada, Otsu (JP); Kenichi Hoshiba, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 1047 days.

(21) Appl. No.: 15/750,656

(22) PCT Filed: May 13, 2016

(86) PCT No.: PCT/JP2016/064284
§ 371 (c)(1),
(2) Date: Feb. 6, 2018

(87) PCT Pub. No.: WO2017/022293
PCT Pub. Date: Feb. 9, 2017

(65) Prior Publication Data
US 2020/0087190 A1 Mar. 19, 2020

(30) Foreign Application Priority Data

Aug. 6, 2015 (JP) .............................. JP2015-156523

(51) Int. Cl.
*C03B 17/04* (2006.01)
(52) U.S. Cl.
CPC .................... *C03B 17/04* (2013.01)
(58) Field of Classification Search
None
See application file for complete search history.

(56) References Cited

U.S. PATENT DOCUMENTS 3,194,645 A * 7/1965 Green ..................... C03B 17/04
65/167
3,360,354 A * 12/1967 Bates ..................... C03B 17/04
65/184

(Continued)

FOREIGN PATENT DOCUMENTS

JP      H01129232 U1    9/1989
JP      H05294651 A     11/1993
(Continued)

OTHER PUBLICATIONS

JP H05-301728 A (Kasai) Nov. 16, 1993 (English language machine translation). [online] [retrieved May 30, 2020]. Retrieved from: Espacenet. (Year: 1993).*

(Continued)

*Primary Examiner* — Erin Snelting
(74) *Attorney, Agent, or Firm* — Cantor Colburn LLP

(57) ABSTRACT

Provided is a sleeve for glass tube molding, the sleeve being capable of: preventing the weakening of clamping force between a metal tip and a metal holding fixture even if the distance between the metal tip and the metal holding fixture increases due to the thermal expansion of a sleeve shaft; and ensuring the coaxiality, on the sleeve shaft, of the metal tip, the metal holding fixture and a refractory tube. This sleeve for glass tube molding comprises: a sleeve shaft; a refractory tube into which the sleeve shaft is inserted in a coaxial manner; a metal tip which is at one end of the refractory tube, and is fixed to the tip of the sleeve shaft; and a metal holding fixture which, at the other end of the refractory tube, is slidably inserted in the sleeve shaft, and clamps and holds the sleeve shaft together with the metal tip. A part of the inner circumferential surface of a through-hole, which is in the metal holding fixture and through which the sleeve shaft (Continued)

is inserted, is in close contact with the outer circumferential surface of the sleeve shaft.

2 Claims, 6 Drawing Sheets

(56) References Cited

U.S. PATENT DOCUMENTS

| | | | |
|---|---|---|---|
| 3,364,004 A * | 1/1968 | Cozine | C03B 17/04 |
| | | | 65/187 |
| 7,343,761 B2 | 3/2008 | Dick et al. | |
| 2004/0025540 A1 | 2/2004 | Dick et al. | |

FOREIGN PATENT DOCUMENTS

| | | |
|---|---|---|
| JP | H05301728 A | 11/1993 |
| JP | H11322350 A | 11/1999 |
| JP | 2004525843 A | 8/2004 |
| JP | 2008266082 A | 11/2008 |

OTHER PUBLICATIONS

International Search Report corresponding to Application No. PCT/JP2016/064284; dated Aug. 9, 2016.
Extended European Search Report corresponding to Application No. 16832573.6-1105/3333133 PCT/JP2016064284; dated Feb. 11, 2019.
International Preliminary Report on Patentability for corresponding Application No. PCT/JP2016/064284; dated Feb. 6, 2018.
Written Opinion of the International Searching Authority for corresponding PCT/JP2016/064284; dated Feb. 6, 2018.
JP Notice of Reasons for Refusal corresponding to Application No. 2015-156523; dated Jul. 30, 2019.

* cited by examiner

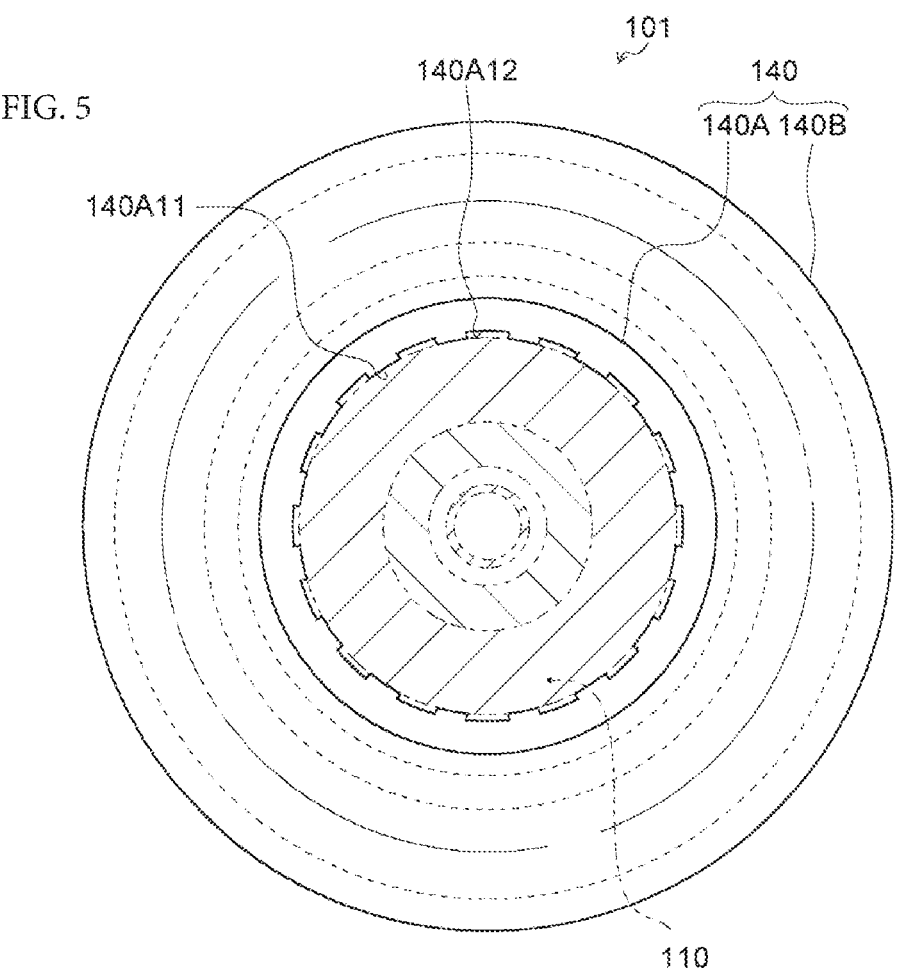

SLEEVE FOR GLASS TUBE MOLDING

CROSS REFERENCE TO RELATED APPLICATIONS

The present U.S. patent application is a U.S. National Phase Application under 35 USC 371 of International Application PCT/JP2016/064284, filed on May 13, 2016. Priority under 35 U.S.C § 119(a) and 35 U.S.C. § 365(b) is claimed from Japanese Application No. 2015-156523 filed on Aug. 6, 2015, the entirety of which is incorporated herein by references.

TECHNICAL FIELD

The present invention relates to a technique about a sleeve for glass tube molding used in the Danner process, more specifically a technique about a metal holding fixture for holding, from the upstream side, a refractory tube that guides, toward the downstream side, molten glass wrapped around its outer circumferential surface.

BACKGROUND ART

Conventionally, the Danner process has been widely used as a method for mass-producing glass tubes and glass rods.

In the Danner process, glass tubes or glass rods are continuously shaped by letting molten glass flow on a sleeve that is supported with its tip inclining downward and is drivingly rotated about its axis, wrapping the flowing molten glass around the outer circumferential surface of the sleeve, and drawing the molten glass while blowing (or without blowing) air from the tip of the sleeve.

The sleeve used in the above Danner process includes, as main components, a sleeve shaft pivotally supported with its tip inclining downward and members into which the sleeve shaft is inserted in order in a coaxial manner, such as a metal tip, a refractory tube, and a metal holding fixture (for example, see "Patent Literature 1").

The metal tip is fixed to the tip of the sleeve shaft, and the metal holding fixture is disposed slidably along the axial direction and constantly urged toward the tip of the sleeve shaft by an urging member.

Hence, the refractory tube is constantly clamped between the metal tip and the metal holding fixture by the urging force of the urging member.

Accordingly, the arrangement posture of the metal tip, the refractory tube, and the metal holding fixture is firmly held, resulting in a structure that hardly cause large runout relative to the sleeve shaft that is drivingly rotated. Unevenness in the thickness of the molten glass drawn from the tip of the sleeve can be thus suppressed, and high-quality glass tubes or glass rods with a high dimensional accuracy can be continuously formed.

The temperature of the molten glass guided onto the sleeve is as high as about 1,000[° C.] or more, and the sleeve undergoes thermal expansion as a whole.

At this time, the amount of thermal expansion of the sleeve shaft in the axis direction is large, and the metal tip gradually moves relatively away from the metal holding fixture.

CITATION LIST

Patent Literature

PTL 1: Japanese Unexamined Patent Application Publication No. 1993-294651

SUMMARY OF INVENTION

Technical Problem

Since the metal holding fixture is constantly urged toward the tip of the sleeve shaft as described above, even when the metal tip moves relatively away from the metal holding fixture, the metal holding fixture follows the movement and immediately and relatively approaches the metal tip.

However, regarding a conventional metal holding fixture, the whole region of its inner circumferential surface is in close contact with the outer circumferential surface of the sleeve shaft while the metal holding fixture slides and moves along the axial direction because the inner circumferential part (hollow part surrounded by the inner circumferential surface) of a through-hole into which the sleeve shaft is inserted is formed such that its cross-section has the same circular shape anywhere along the axial direction (that is, formed as a cylindrical hollow part).

Hence, the area of contact between the inner circumferential surface of the metal holding fixture and the outer circumferential surface of the sleeve shaft is large, resulting in increase in frictional resistance between the metal holding fixture and the sleeve shaft when the metal holding fixture slides. This increase may hinder sliding of the metal holding fixture on the sleeve shaft expanded by heat.

Accordingly, the distance between the metal tip and the metal holding fixture increases, which weakens clamping force between the metal tip and the metal holding fixture and increases the possibility of deviations from coaxiality, on the sleeve shaft, of the metal tip, the refractory tube, and the metal holding fixture. It is thus difficult to suppress unevenness in the thickness of the molten glass drawn from the tip of the sleeve and to continuously form high-quality glass tubes or glass rods with a high dimensional accuracy.

The present invention has been made in view of the current problem above and has an object to provide a sleeve for glass tube molding, the sleeve being capable of: preventing the weakening of clamping force between a metal tip and a metal holding fixture even if, for example, the distance between the metal tip and the metal holding fixture increases due to the thermal expansion of a sleeve shaft; and ensuring the coaxiality, on the sleeve shaft, of the metal tip, a refractory tube, and the metal holding fixture.

Solution to Problem

The problem to be solved by the present invention is as described above, and a solution to the above problem will be described next.

That is, a sleeve for glass tube molding according to the present invention includes: a sleeve shaft; a refractory tube into which the sleeve shaft is inserted in a coaxial manner; a metal tip at one end of the refractory tube, the metal tip being secured to a tip of the sleeve shaft; and a metal holding fixture into which the sleeve shaft is slidably inserted, the metal holding fixture being disposed at another end of the refractory tube, and clamping and holding the sleeve shaft together with the metal tip. Part of an inner circumferential surface of a through-hole, into which the sleeve shaft is inserted, in the metal holding fixture is in close contact with an outer circumferential surface of the sleeve shaft.

As described above, only part of the inner circumferential surface of the through-hole in the metal holding fixture in the sleeve for glass tube molding in the present invention is in close contact with the outer circumferential surface of the sleeve shaft, and frictional resistance during sliding along the axial direction is reduced compared with a conventional metal holding fixture because the area of contact between the inner circumferential surface and the sleeve shaft is lessened.

Hence, the metal holding fixture in the present invention is, for example, less likely to experience the difficulty in sliding due to sudden engagement in a middle portion of the sleeve shaft expanded by heat in the axial direction, and the urging force of the above urging member easily makes the metal holding fixture slide toward the refractory tube.

Accordingly, for example, even when the distance between the metal tip and the metal holding fixture increases due to thermal expansion of the sleeve shaft, weakening of the clamping force between the metal tip and the metal holding fixture is prevented, and the coaxiality, on the sleeve shaft, of the metal tip, the refractory tube, and the metal holding fixture is ensured, thereby suppressing unevenness in the thickness of the molten glass drawn from the tip of the sleeve and enabling continuous formation of high-quality glass tubes or glass rods with a high dimensional accuracy.

Also, in the sleeve for glass tube molding according to the present invention, the metal holding fixture may preferably have an annular undercut in a middle portion, in an axial direction, of the inner circumferential surface of the through-hole, the undercut extending in a circumferential direction.

The sleeve for glass tube molding having the above structure is economical because such a simple structure as to be made by simply forming the annular undercut on the inner circumferential surface of the through-hole of the metal holding fixture lessens the area of contact with the sleeve shaft and reduces the frictional resistance during sliding of the metal holding fixture along the axial direction.

Alternatively, in the sleeve for glass tube molding according to the present invention, the metal holding fixture may preferably have a plurality of undercuts along a circumferential direction on the inner circumferential surface of the through-hole, the undercuts extending in an axial direction.

With the sleeve for glass tube molding having the above structure, the sleeve shaft can be inserted into the through-hole of the metal holding fixture while suppressing increase in the inclination of the axial direction.

Hence, labors of an operator to insert the sleeve shaft into the metal holding fixture is reduced.

Advantageous Effects of Invention

Advantageous effects of the present invention are as follows.

That is, the sleeve for glass tube molding according to the present invention is capable of: preventing the weakening of the clamping force between the metal tip and the metal holding fixture even if, for example, the distance between the metal tip and the metal holding fixture increases due to the thermal expansion of the sleeve shaft; and ensuring the coaxiality, on the sleeve shaft, of the metal tip, the refractory tube, and the metal holding fixture.

BRIEF DESCRIPTION OF DRAWINGS

FIG. 5 is an end view for illustrating the shape of the metal holding fixture according to the other embodiment viewed in the direction of the arrows C in FIG. 4.

FIG. 6A is a diagram illustrating the case of the metal holding fixture according to the present embodiment, and FIG. 6B is a diagram illustrating the case of the metal holding fixture according to the other embodiment.

DESCRIPTION OF EMBODIMENTS

Subsequently, embodiments of the invention will be described referring to FIG. 1 to FIGS. 6A-6B.

Figure 1:
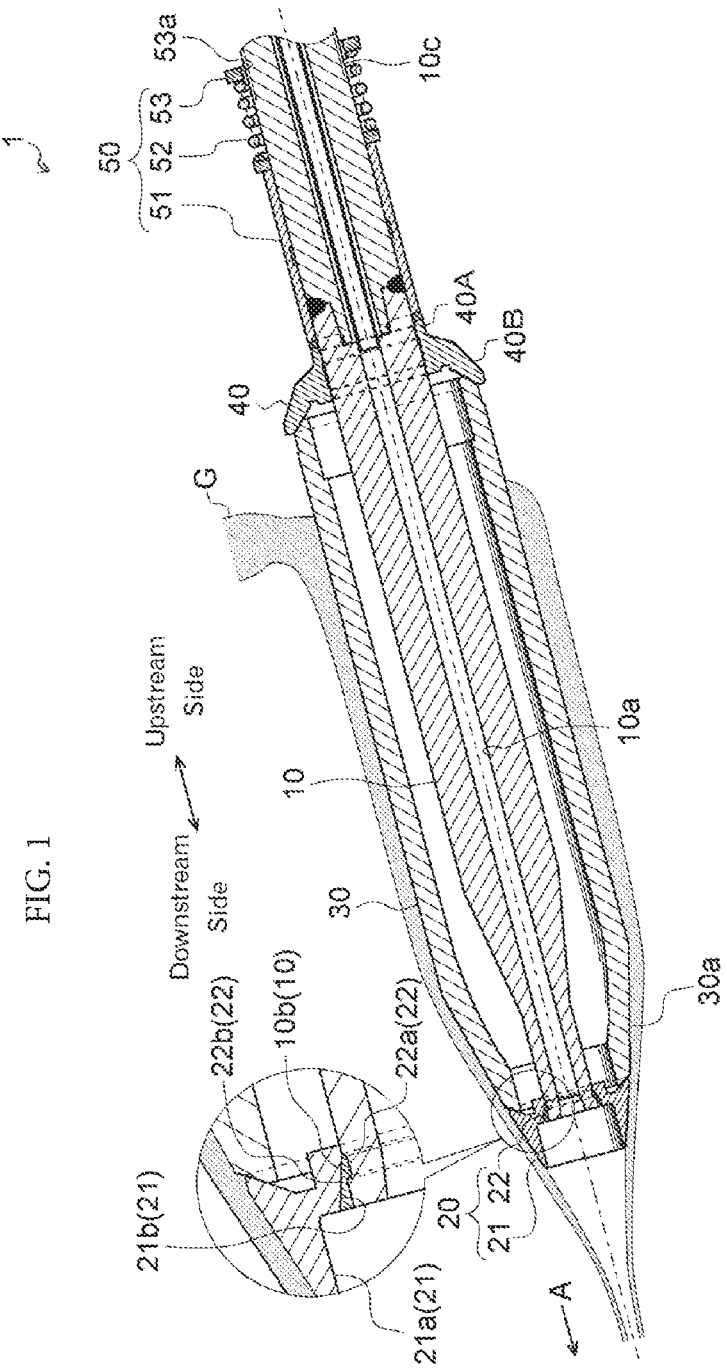
FIG. 1 is a sectional side view for illustrating the general arrangement of a sleeve for glass tube molding according to the present invention.
Figure 2:
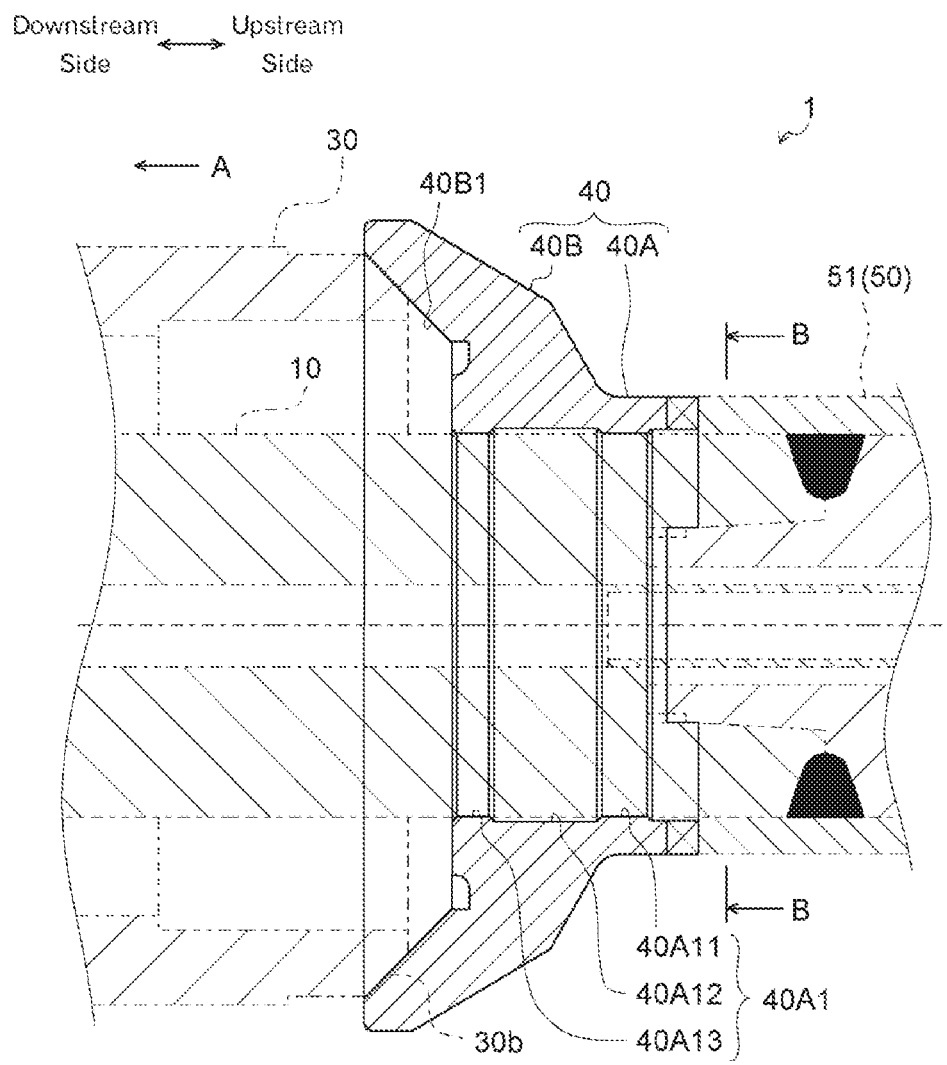
FIG. 2 is a sectional side view for illustrating the shape of a metal holding fixture according to the present embodiment.
Figure 3:
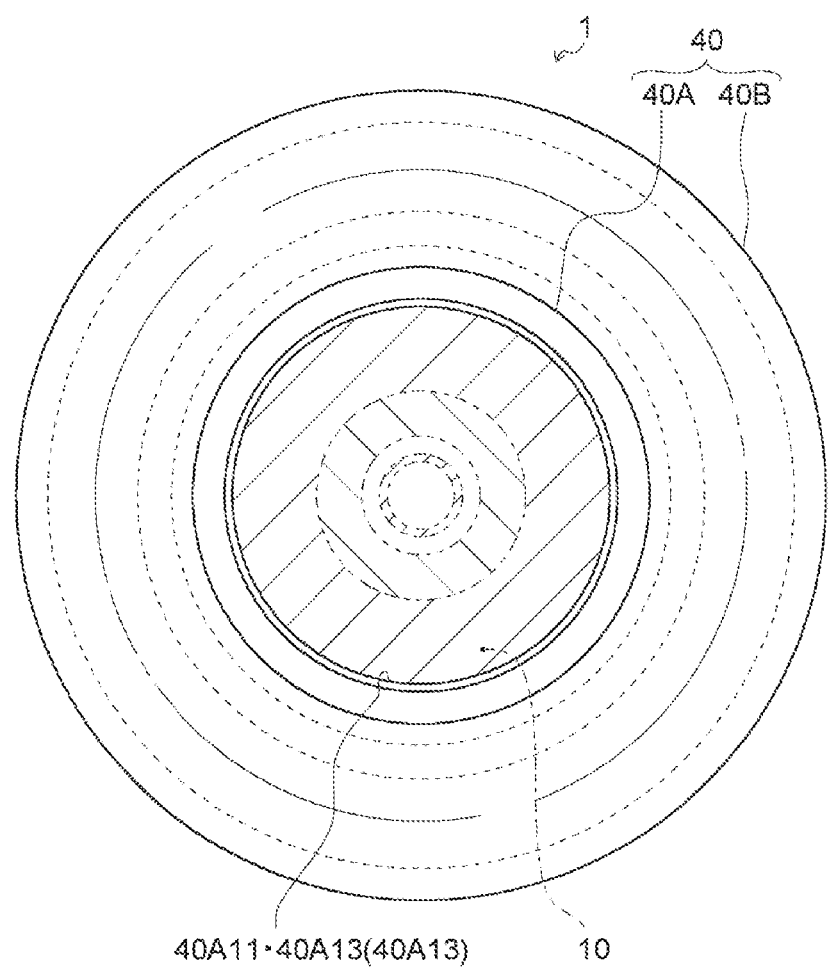
FIG. 3 is an end view for illustrating the shape of the metal holding fixture according to the present embodiment viewed in the direction of the arrows B in FIG. 2.
Figure 4:
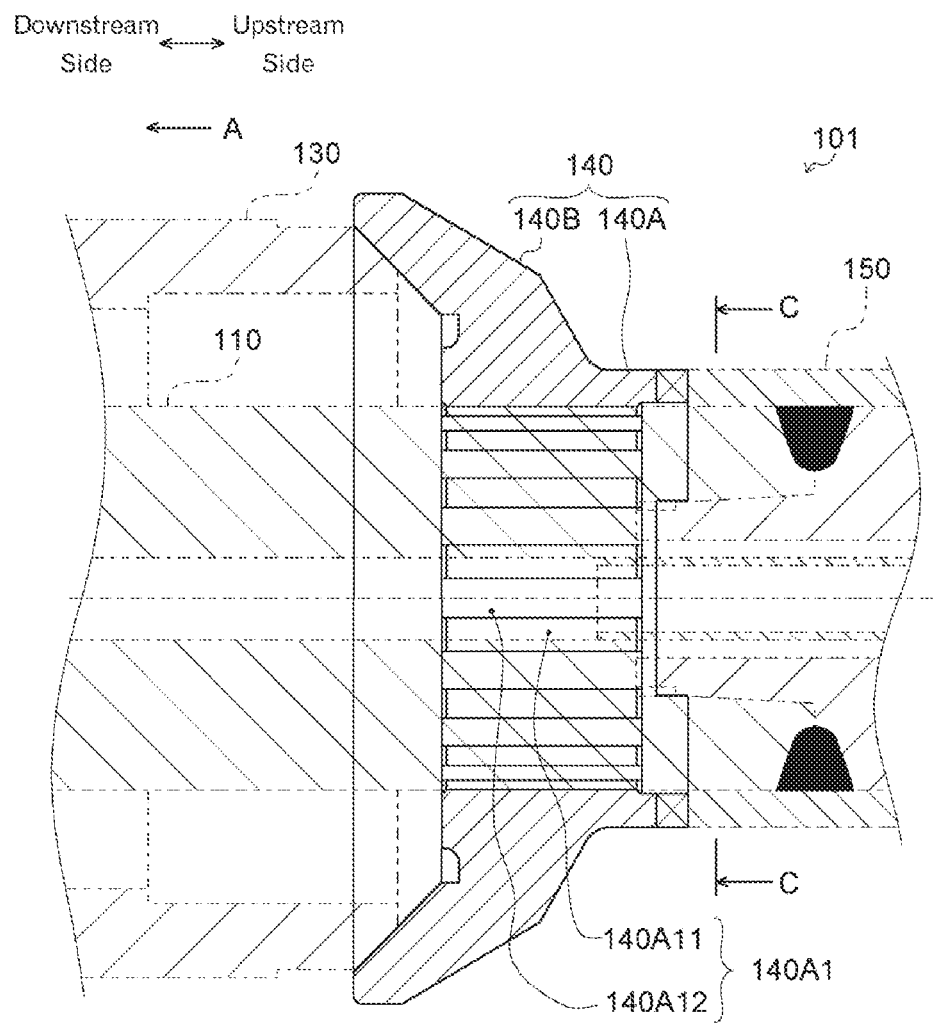
FIG. 4 is a sectional side view for illustrating the shape of a metal holding fixture according to another embodiment.

In the descriptions below, the direction of the arrow A in FIG. 1, FIG. 2, and FIG. 4 is assumed to be the drawing direction (conveying direction) of molten glass G for convenience. Also, in the descriptions below, the vertical direction in FIG. 1 to FIGS. 6A-6B is assumed to be the vertical direction of a sleeve 1 for glass tube molding or a metal holding fixture 40 or 140 for convenience.

[Sleeve 1 for Glass Tube Molding]

The general arrangement of the sleeve 1 for glass tube molding (hereinafter simply referred to as the "sleeve 1") embodying the present invention is first described referring to FIG. 1.

The sleeve 1 in the present embodiment is used for, for example, mass-producing glass tubes and glass rods by the Danner process.

The sleeve 1 includes a sleeve shaft 10, a metal tip 20, a refractory tube 30, the metal holding fixture 40, and an urging mechanism 50 as main components.

The sleeve shaft 10 is the base of the sleeve 1.

The sleeve shaft 10 includes a long round bar member made of, for example, a heat resisting steel such as Fe—Co—Ni alloys and Fe—Cr—Ni alloys, and a through-hole 10a is formed inside the sleeve shaft 10 in a coaxial manner.

The sleeve shaft 10 is arranged such that its one end (end on the drawing direction side (the side in the direction of the arrow A in FIG. 1) of the molten glass G) inclines downward, and the other end is detachably supported by a rotational driving device (not illustrated). The through-hole 10a of the sleeve shaft 10 communicates with an air supplying device (not illustrated) at the other end via a piping member or the like.

Subsequently, the metal tip 20 will be described.

The metal tip 20 is a metal tip according to an embodiment constituting the tip of the sleeve 1. The metal tip 20 and the metal holding fixture 40 described later clamp and hold the refractory tube 30.

The metal tip 20 includes a main body member 21 and a collar member 22 used for fixing the main body member 21 to the sleeve shaft 10.

The main body member 21 includes a truncated-cone-shaped member made of, for example, a heat resisting steel such as Fe—Co—Ni alloys and Fe—Cr—Ni alloys and is disposed at the tip of the sleeve shaft 10 coaxially with the sleeve shaft 10. The cross-sectional area of the main body member 21 gradually becomes smaller in diameter toward the drawing side (hereinafter referred to as the "downstream side") of the molten glass G.

At the downstream-side end of the main body member 21, a depressed portion 21a having a circular cross-sectional shape is formed in a coaxial manner.

On the end surface on the side (hereinafter referred to as the "upstream side") opposite to the downstream side of the depressed portion 21a, a through-hole 21b is formed in a coaxial manner.

The through-hole 21b is formed into a tapered shape the cross-sectional shape of which gradually becomes smaller in diameter from the downstream side toward the upstream side.

The collar member 22 includes an annular member made of, for example, a heat resisting steel such as Fe—Co—Ni alloys and Fe—Cr—Ni alloys and is disposed at the tip (downstream-side end) of the sleeve shaft 10 coaxially with the sleeve shaft 10.

The collar member 22 has a halved structure divided into two parts in the radial direction, and one end of the inner circumferential surface of the collar member 22 has an annular projecting portion 22a formed coaxially with the collar member 22.

An annular depressed portion 10b is formed on the outer circumferential surface of the downstream-side end of the sleeve shaft 10.

By fitting the projecting portion 22a of the collar member 22 into the depressed portion 10b of the sleeve shaft 10, movement of the collar member 22 along the axial direction is regulated, and the collar member 22 is held by the sleeve shaft 10.

An outer circumferential surface 22b of the collar member 22 is formed into a tapered shape the cross-sectional area of which gradually becomes smaller in diameter from the downstream side toward the upstream side so as to conform to the through-hole 21b of the main body member 21.

The main body member 21 is held at the tip (downstream-side end) of the sleeve shaft 10 with the collar member 22 having the above structure disposed therebetween. Specifically, by fitting the through-hole 21b of the main body member 21 with the outer circumferential surface 22b of the collar member 22, movement of the main body member 21 toward the downstream side along the axial direction is regulated, and the main body member 21 is held by the sleeve shaft 10.

In other words, the metal tip 20 is fixed to the tip (downstream-side end) of the sleeve shaft 10.

Subsequently, the refractory tube 30 will be described.

The molten glass G guided onto the sleeve 1 is wrapped around the outer circumferential surface of the refractory tube 30 and is gradually conveyed toward the downstream side.

The refractory tube 30 includes a long, hollow round bar member made of, for example, a silica-alumina or silica-alumina-zirconia refractory, and a tapered portion 30a the cross-sectional area of which gradually becomes smaller in diameter is formed at one end of the refractory tube 30.

The outer circumferential surface of the refractory tube 30 is covered with, for example, a platinum or platinum-alloy film having a thickness of 250 [μm] to 450 [μm].

On the upstream side of the metal tip 20, the sleeve shaft 10 is inserted into the refractory tube 30 in a coaxial manner with the tapered portion 30a oriented toward the downstream side.

Accordingly, the metal tip 20 is arranged on the one end side (downstream side) of the refractory tube 30, and the tapered portion 30a of the refractory tube 30 is smoothly connected with the tapered shape of the outer circumferential surface of the metal tip 20 (more specifically, the main body member 21) at the downstream-side end of the sleeve 1 as a whole.

Subsequently, the metal holding fixture 40 will be described.

The metal holding fixture 40 clamps and holds the refractory tube 30 together with the metal tip 20.

As described later in detail, the metal holding fixture 40 includes a hollow cylindrical main body portion 40A and a flange portion 40B disposed on the outer circumferential surface of the main body portion 40A.

On the other end side (upstream side) of the refractory tube 30, the sleeve shaft 10 is slidably inserted into the main body portion 40A of the metal holding fixture 40 in a coaxial manner, and the flange portion 40B has contact with the end of the refractory tube 30.

Subsequently, the urging mechanism 50 will be described.

The urging mechanism 50 urges the metal holding fixture 40 toward the downstream side along the axial direction.

The urging mechanism 50 includes, for example, a contact member 51, an urging member 52, and an adjusting nut 53.

The contact member 51 has direct contact with the metal holding fixture 40.

The contact member 51 is made of a hollow cylindrical member, and its inside diameter is somewhat larger than the outside diameter of the sleeve shaft 10.

On the upstream side of the metal holding fixture 40, the contact member 51 is arranged coaxially with the sleeve shaft 10 and slidably along the axial direction.

The structure of the contact member 51 is not limited to the present embodiment. For example, a structure without the contact member 51 (in other words, the metal holding fixture 40 and the contact member 51 are integrally formed) may be made by extending the upstream-side end of the metal holding fixture 40 along the axial direction.

The urging member 52 urges the contact member 51 toward the metal holding fixture 40 side (that is, downstream side).

The urging member 52 includes, for example, a known compression spring.

The urging member 52 is arranged between the contact member 51 and the adjusting nut 53 coaxially with the sleeve shaft 10. Movement of the end of the urging member 52 on the adjusting nut 53 side toward the upstream side is regulated.

The urging member 52 thus urges the contact member 51 toward the downstream side.

The adjusting nut 53 is used for adjusting the urging force of the urging member 52.

The adjusting nut 53 is made of an annular member having an internal thread 53a formed on its inner circumferential surface.

The outer circumferential surface of the sleeve shaft 10 has an external thread 10c formed on its upstream-side end above the urging member 52.

The sleeve shaft 10 is screwed into the adjusting nut 53 on the upstream side of the urging member 52 using the external thread 10c and the internal thread 53a.

This structure enables the arrangement position of the adjusting nut 53 to be minutely moved along the axial direction.

Accordingly, the dimension of the gap between the contact member 51 and the adjusting nut 53, that is, the total length of the urging member 52, can be minutely changed, thereby enabling fine adjustments of the urging force of the urging member 52.

As described above, the sleeve 1 in the present embodiment includes the sleeve shaft 10 and members disposed on the sleeve shaft 10 in the order from the downstream side to the upstream side in a coaxial manner, such as the metal tip 20, the refractory tube 30, the metal holding fixture 40, and the urging mechanism 50.

The metal tip 20 is fixed to the tip of the sleeve shaft 10. The metal holding fixture 40 is disposed slidably along the axial direction and constantly urged toward the tip of the sleeve shaft 10 by the urging mechanism 50.

Hence, the refractory tube 30 is constantly clamped between the metal tip 20 and the metal holding fixture 40 by the urging force of the urging mechanism 50.

Accordingly, the arrangement posture of each of the metal tip 20, the refractory tube 30, and the metal holding fixture 40 is firmly held, and large runout relative to the sleeve shaft that is drivingly rotated is hardly caused.

Glass tubes or glass rods are continuously shaped by drivingly rotating the sleeve 1 having the above structure about the axis, letting the molten glass G flow on the drivingly rotated sleeve 1 (more specifically, on the refractory tube 30), wrapping the flowing molten glass G around the outer circumferential surface of the sleeve 1, and drawing the molten glass G while blowing air from the tip of the sleeve 1 (more specifically, from the depressed portion 21a of the metal tip 20).

[Metal Holding Fixture 40]

Subsequently, the structure of the metal holding fixture 40 will be described in detail referring to FIG. 2 and FIG. 3.

The metal holding fixture 40 is made of, for example, a heat resisting steel such as Fe—Co—Ni alloys and Fe—Cr—Ni alloys and includes, as main components, the hollow cylindrical main body portion 40A and the flange portion 40B disposed at one end of the outer circumferential surface of the main body portion 40A, as shown in FIG. 2.

The metal holding fixture 40 is disposed between the refractory tube 30 and the contact member 51 of the urging mechanism 50 coaxially with the sleeve shaft 10, with the flange portion 40B oriented toward the downstream side (refractory tube 30 side).

In the main body portion 40A, the inner circumferential surface of the through-hole 40A1 into which the sleeve shaft 10 is inserted provides an inside diameter approximately equal to the outside diameter of the sleeve shaft 10, and an annular undercut extending in the circumferential direction is formed in a coaxial manner in the middle portion in the axial direction of the inner circumferential surface.

Specifically, the inner circumferential surface of the through-hole 40A1 includes a first inner circumferential surface 40A11, a second inner circumferential surface 40A12 serving as the undercut, and a third inner circumferential surface 40A13 in the order from the upstream side to the downstream side.

The first inner circumferential surface 40A11 and the third inner circumferential surface 40A13 provide inside diameters approximately equal to the outside diameter of the sleeve shaft 10 (more specifically, slightly larger than the outside diameter of the sleeve shaft 10). The second inner circumferential surface 40A12 provides an inside diameter larger than the outside diameter of the sleeve shaft 10.

As described above, as shown in FIG. 3, not the whole region of the inner circumferential surface of the main body portion 40A of the metal holding fixture 40 in the present embodiment is in close contact with the outer circumferential surface of the sleeve shaft 10, but only part (that is, the first inner circumferential surface 40A11 and the third inner circumferential surface 40A13) of the inner circumferential surface is in close contact with the outer circumferential surface of the sleeve shaft 10.

Hence, the area of contact between the metal holding fixture 40 and the sleeve shaft 10 is smaller than in the case of a conventional metal holding fixture where the inner circumferential surface does not have the annular undercut in the middle portion in the axial direction (that is, the entire surface is in close contact with the outer circumferential surface of the sleeve shaft), and the frictional resistance during sliding of the metal holding fixture 40 along the axial direction is thus reduced.

Hence, the metal holding fixture 40 is, for example, less likely to experience the difficulty in sliding due to sudden engagement in the middle portion of the sleeve shaft 10 expanded by heat in the axial direction, and the urging force of the urging mechanism 50 (see FIG. 1) easily makes the metal holding fixture 40 slide toward the downstream side.

Accordingly, even when the distance between the metal tip 20 (see FIG. 1) and the metal holding fixture 40 increases due to thermal expansion of the sleeve shaft 10, the clamping force (that is, the urging force of the urging mechanism 50) between the metal tip 20 and the metal holding fixture 40 is not weakened, and the metal tip 20, the refractory tube 30, and the metal holding fixture 40 are constantly and firmly held coaxially with the sleeve shaft 10, thereby suppressing unevenness in the thickness of the molten glass G drawn from the tip of the sleeve 1 and enabling continuous formation of high-quality glass tubes or glass rods with a high dimensional accuracy.

As shown in FIG. 2, the edge portion of the downstream-side end surface of the flange portion 40B has a depressed portion 40B1 formed into a tapered shape the cross-sectional shape of which gradually becomes smaller in diameter toward the upstream side in the axial direction. On the other hand, the upstream-side (metal holding fixture 40 side) end surface of the refractory tube 30 has an edge portion 30b formed into a tapered shape the cross-sectional shape of which gradually becomes smaller in diameter toward the upstream side in the axial direction.

The tapered depressed portion 40B1 of the metal holding fixture 40 has contact with the tapered edge portion 30b of the refractory tube 30 in a coaxial manner.

Accordingly, the metal holding fixture 40 regulates decentering at the upstream-side end of the refractory tube 30.

[Metal Holding Fixture 140 (Another Embodiment)]

Subsequently, the structure of the metal holding fixture 140 in another embodiment will be described in detail referring to FIG. 4 to FIGS. 6A-6B.

The metal holding fixture 140 in the other embodiment has approximately the same structure as the above metal holding fixture 40 but differs from the metal holding fixture 40 in the shape of the inner circumferential surface of a through-hole 140A1.

Hence, the following mainly describes the differences from the metal holding fixture 40, and descriptions of the same part of the structure as the structure of the metal holding fixture 40 is omitted.

As shown in FIG. 4, the metal holding fixture 140 includes a hollow cylindrical main body portion 140A and a flange portion 140B disposed at one end of the outer circumferential surface of the main body portion 140A as main components.

In the main body portion 140A, the inner circumferential surface of the through-hole 140A1 into which a sleeve shaft 110 is inserted provides an inside diameter approximately equal to the outside diameter of the sleeve shaft 110 and has a plurality of undercuts radially arranged when viewed in the axial direction.

In other words, a plurality of undercuts extending in the axial direction are formed along the circumferential direction on the inner circumferential surface of the through-hole 140A1.

Specifically, the inner circumferential surface of the through-hole 140A1 includes rectangular projecting fourth inner circumferential surfaces 140A11 extending in the axial direction and rectangular depressed fifth inner circumferential surfaces 140A12 serving as the undercuts also extending in the axial direction. A plurality of fourth inner circumferential surfaces 140A11, 140A11, . . . and a plurality of fifth inner circumferential surfaces 140A12, 140A12, . . . are alternately arranged along the circumferential direction as shown in FIG. 5.

The inside diameter provided by the fourth inner circumferential surfaces 140A11, 140A11, is approximately equal to the outside diameter of the sleeve shaft 110 (more specifically, slightly larger than the outside diameter of the sleeve shaft 110). The inside diameter provided by the fifth inner circumferential surfaces 140A12, 140A12, . . . is larger than the outside diameter of the sleeve shaft 10.

As described above, as shown in FIG. 4, not the whole region of the inner circumferential surface of the main body portion 140A of the metal holding fixture 140 in the present embodiment is in close contact with the outer circumferential surface of the sleeve shaft 110, but only part (that is, the fourth inner circumferential surfaces 140A11, 140A11, . . . ) of the inner circumferential surface is in close contact with the outer circumferential surface of the sleeve shaft 110.

Hence, since the area of contact with the sleeve shaft 110 is smaller than in the case of the inner circumferential surface of the above conventional metal holding fixture, the frictional resistance during sliding of the metal holding fixture 140 along the axial direction is reduced.

Hence, similarly to the above metal holding fixture 40, the metal holding fixture 140 is easily made to slide toward the downstream side by the urging force of an urging mechanism 150, in the middle portion of the sleeve shaft 110 expanded by heat in the axial direction.

Accordingly, the metal tip (not illustrated), a refractory tube 130, and the metal holding fixture 140 are constantly and firmly held coaxially with the sleeve shaft 110 without being affected by thermal expansion of the sleeve shaft 110, thereby suppressing unevenness in the thickness of the molten glass G drawn from the tip of a sleeve 101 and enabling continuous formation of high-quality glass tubes or glass rods with a high dimensional accuracy.

Figure 6A:
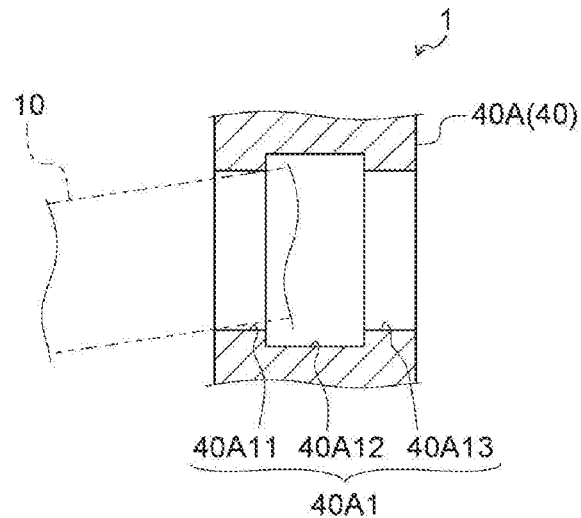
FIGS. 6A-6B illustrates insertion of sleeve shafts into inner circumferential parts of the metal holding fixtures.

When the sleeve shaft 10 is inserted into the through-hole 40A1 of the metal holding fixture 40 having the annular undercut 40A12 extending in the circumferential direction in the middle portion in the axial direction of the through-hole 40A1 as shown in FIG. 2, there may be a case where the sleeve shaft 10 gets caught on the third inner circumferential surface 40A13 and cannot be inserted as shown in FIG. 6A due to inclination of the sleeve shaft 10 toward a certain direction in the gap between the sleeve shaft 10 and the first inner circumferential surface 40A11 on the first inner circumferential surface 40A11.

Figure 6B:
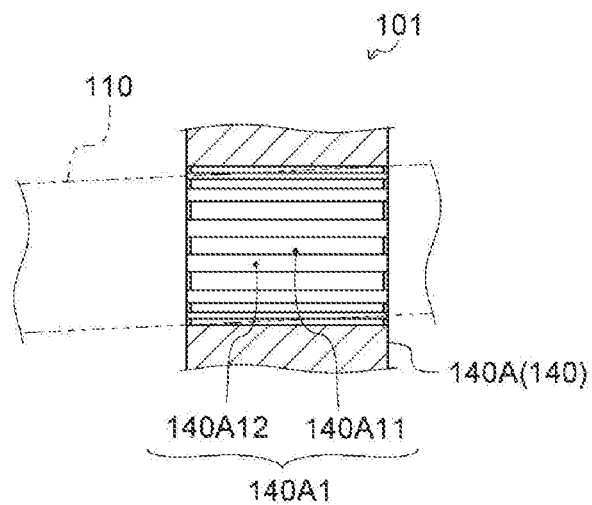

On the other hand, when the sleeve shaft 110 is inserted into the through-hole 140A1 of the metal holding fixture 140 having the undercuts 140A12 extending along the axial direction of the through-hole 140A1, the sleeve shaft 110 can be inserted without being caught in the through-hole 140A as shown in FIG. 6B.

Hence, the metal holding fixture 140 in the embodiment shown in FIG. 5 has the advantage that labors of an operator to insert the sleeve shaft 110 into the metal holding fixture 140 is further reduced.

INDUSTRIAL APPLICABILITY

The sleeve for glass tube molding according to the present invention can be used in a technique about a metal holding fixture for holding, from the upstream side, a refractory tube that guides, toward the downstream side, molten glass wrapped around its outer circumferential surface in, for example, the Danner process.

REFERENCE SIGNS LIST 1 sleeve for glass tube molding
10 sleeve shaft
20 metal tip
30 refractory tube
40 metal holding fixture
40A1 through-hole
40A12 second inner circumferential surface (undercut)
110 sleeve shaft
130 refractory tube
140 metal holding fixture
140A1 through-hole
140A12 fifth inner circumferential surfaces (undercuts)

The invention claimed is:

1. A sleeve for glass tube molding, the sleeve comprising:
a sleeve shaft;
a refractory tube into which the sleeve shaft is inserted in a coaxial manner;
a metal tip at one end of the refractory tube, the metal tip being secured to a tip of the sleeve shaft; and
a metal holding fixture into which the sleeve shaft is slidably inserted, the metal holding fixture being disposed at another end of the refractory tube, and clamping and holding the refractory tube together with the metal tip,
wherein part of an inner circumferential surface of a through-hole, into which the sleeve shaft is inserted, in the metal holding fixture is in close contact with an outer circumferential surface of the sleeve shaft;
wherein the metal holding fixture has an annular undercut in a middle portion, in an axial direction, of the inner circumferential surface of the through-hole, the undercut extending in a circumferential direction.

2. A method of manufacturing a glass tube, the method comprising:
providing a sleeve for glass tube molding comprising:
a sleeve shaft;
a refractory tube into which the sleeve shaft is inserted in a coaxial manner;
a metal tip at one end of the refractory tube, the metal tip being secured to a tip of the sleeve shaft; and
a metal holding fixture into which the sleeve shaft is slidably inserted, the metal holding fixture being disposed at another end of the refractory tube, and clamping and holding the refractory tube together with the metal tip;
wherein part of an inner circumferential surface of a through-hole in the metal holding fixture, into which the sleeve shaft is inserted, is in close contact with an outer circumferential surface of the sleeve shaft;

supporting the sleeve for glass tube molding with a tip of the sleeve for glass tube molding inclining downward and drivingly rotating the sleeve for glass tube molding about an axis of the sleeve for glass tube molding; and causing a molten glass to flow down on the sleeve for glass tube molding, wherein the glass tube is shaped by letting molten glass flow on the refractory tube that is wrapping the flowing molten glass around an outer circumferential surface of the refractory tube, and drawing the molten glass from the tip of the sleeve;

wherein the metal holding fixture has an annular undercut in a middle portion, in an axial direction, of the inner circumferential surface of the through-hole, the undercut extending in a circumferential direction.

* * * * *